Patented Sept. 8, 1942

2,294,972

UNITED STATES PATENT OFFICE 2,294,972

IMPROVING SCRUBBING MEDIUMS BY MEANS OF AMINOPHENOL DERIVATIVES

Louis J. Figg, Jr., and Edward E. Shaulis, Kingsport, Tenn., assignors to Eastman Kodak Company, Rochester, N. Y., a corporation of New Jersey No Drawing. Application February 21, 1940, Serial No. 320,168

11 Claims. (Cl. 183—115)

This invention relates to the improvement of scrubbing mediums and the use of such mediums in the treatment of artificial gas, particularly to the treatment of such scrubbing oils to render them susceptible of reactivation, or other processing with a minimum of undesirable sludge formation.

In the production of city gas and the utilization thereof, there is encountered the troublesome problems of the formation of various deposits of sludge or gums during such gas production and handling. Not only does such sludge formation trap or otherwise cause the loss of scrubbing mediums, but such deposits may interfere with the operation of or damage apparatus. Such difficulties and problems encountered in the gas industry have been described to some extent in Karrer and Lusby U. S. patent application 156,230, now Patent No. 2,191,486. As indicated in this patent, certain methods of treating artificial gas have involved scrubbing the gas with a scrubbing oil. Subsequently, the oil would be heated or otherwise processed for regenerating the oil. In processes of this type, losses of oil and other difficulties referred to above occurred. In view of the consideration of these various problems in said Karrer and Lusby patent, it is unnecessary at this point to discuss them further.

Inventors Karrer and Lusby have devised a procedure which has made a substantial advance in reducing or overcoming the difficulties aforementioned. But notwithstanding, it is readily apparent that it is a highly desirable result if still further and improved methods and chemicals can be devised for overcoming such difficulties, which have faced the gas industry. It is also further apparent that the development of other chemicals and methods for overcoming these problems of sludge formation and the like, is particularly desirable from the practical standpoint in order that the solution to the difficulty may not be based on and be dependent upon one particular type of reagent.

After extensive investigation we have discovered certain reagents which may be used for overcoming or minimizing sludge formation and allied difficulties encountered in the gas industry. Our reagents exhibit improved chemical efficacy as will be pointed out in detail hereinafter.

This invention has for one object to provide reagents, classes of reagent, chemical compounds or mixtures thereof which may be used in the gas industry for minimizing or eliminating sludge formation and related or allied difficulties. Another object is to provide improvement in gas treating processes wherein scrubbing medium, such as an oil, is used to improve the operation of the process and to render the medium more readily susceptible to reactivation. Another object is to reduce or prevent losses of various chemical compounds in such gas treating processes and to render such chemical compounds in a form susceptible of recovery. A still further object is to provide reagents for use in the gas industry, exhibiting high chemical efficacy and capable of being utilized in relatively small amounts. A still further object is to provide new scrubbing mediums for use in the artificial gas industry, the separation of gaseous mixtures, the recovery of unsaturated compounds and related fields. Still another object is to reduce or minimize the gumming, or analogous handicapping and injury, of certain of the equipment used in the artificial gas industry. Other objects will appear hereinafter.

We have found that improved results may be obtained particularly in scrubbing steps of processing artificial gas by utilization of a scrubbing medium containing a substituted hydroxy benzene, preferably an aminophenol of a certain type, as will be described in detail hereinafter.

The production of various types of artificial gas are well-known processes and a description of illustrative processes may be found in "Rogers Industrial Chemistry," vol. II, chapter 24. The exact method of production of the gas to be treated is not vital as respects the present invention. It is pointed out that after artificial gas has been produced, prior to its utilization and/or distribution, the gas may be subjected to a washing or scrubbing treatment by means of various mediums. One scrubbing medium frequently used is the high boiling petroleum oil known as "Absorbent" or "Straw oil." Our invention is described with particular reference to such conventional scrubbing mediums, but it is to be understood that there are various other mediums which may be employed in a comparable manner; hence, we do not wish our invention to be unduly restricted in this aspect. The scrubbing medium, as for example petroleum oil of some nature, may be brought into contact with the gas as by countercurrent contact in a column, sprayed through the gas, or the gas otherwise treated with oil.

After the oil has been brought into contact with the gas, the oil then contains various materials removed from the gas and in order to render the oil reusable, it may be subjected to various types of reactivation or regeneration treatments. As a result of such treatments which usually involve heating and distillation, sludge formation, gumminess or other difficulties may occur which not only may handicap the operation of the process, but may entail actual losses of the scrubbing medium through entrapment, discoloration thereof, or otherwise.

In further detail, for example in the conventional operation of a process for scrubbing artificial gas, the oil scrubbing medium used was followed by heating to drive off the oil so that it might be recycled. In this process several per cent of the volume of the oil was lost each time the oil was recycled. The exact amount lost in any particular instance depends to some extent on the composition of the gas being scrubbed. However, under most favorable treating conditions at least 1% or 2% of the oil was lost in each cycle and higher losses were encountered.

We found that such difficulties could be materially alleviated and in some instances practically eliminated by incorporating in the scrubbing medium at any point in the cycle a small amount of an alkyl aminophenol or mixtures thereof. Various amounts ranging from .005% to .500% by weight of the scrubbing medium have been found satisfactory. However, for most purposes the maximum addition need not exceed about .100%. In the instances where a polymerizable hydrocarbon is being recovered, it may be desirable to use amounts other than those specified, depending upon the quantity and reactivity of the compound to be recovered.

The effectiveness and improved nature of our compounds will be more apparent from the following comparison. In comparing the effectiveness of our compounds with other reagents, there are various factors which could be taken into consideration, such as, for example, the cost of a unit volume of our reagent as compared with other reagents. Or, other factors such as the availability of the respective agents, the hazards of handling the agents, etc.

These factors have been referred to in order to indicate that we are not unmindful of such aspects. However, for clarity and simplicity of comparison, the comparisons herein referred to have been made on a chemical basis, namely, chemical reactivity.

For the purpose of a standard of comparison, we have arbitrarily adopted as a standard, a scrubbing medium having incorporated therein a certain amount of a distillate derived from a hard wood tar. The sample of hard wood tar used in preparing the standard was one having a boiling point between about 200° C.–300° C. but otherwise was conventional and average. However, it is believed that this provides a very satisfactory standard, inasmuch as such distillate boiling between about 200°–300° C. derived from hard wood tar is used commercially and represents a very satisfactory agent for reducing sludge formation.

In making our comparison, the standard was prepared comprising the scrubbing oil having incorporated therein the distillate from wood tar as above discussed. The scrubbing medium to be compared with the standard, comprised the same oil having incorporated therein our novel alkyl aminophenol compounds. The volumes and like conditions were the same in both instances and as customary in chemical tests, a plurality of runs were made in order that check results would be simultaneously obtained.

The standard and the material to be tested and compared therewith, were subjected to the same treatment, within reasonable range permitted for experimental error, and to a rather drastic treatment involving temperatures of 212° F., the presence of oxygen, for substantial periods of time. For convenience, the comparison arrived at will be referred to as the resistance of the material tested with respect to said standard. The values arrived at below were computed in accordance with the following equation:

$$\frac{\text{Resistance of the reference oil plus material tested} - \text{resistance of the reference oil}}{\text{Resistance of the reference oil plus standard hard wood distillate} - \text{the resistance of the reference oil}}$$

By such a comparison it can be seen that results are more or less in terms of reagent used, any deviations due to a possible variation in the scrubbing medium being substantially eliminated.

On the basis of such comparison, our preferred agents all exhibited very high sludge preventing ratios. For example,

| Name | Sludge-preventing ratio |
| --- | --- |
| Monomethyl para aminophenol | 14.0 |
| Monobutyl para aminophenol | 20.0 |
| Monoamyl para aminophenol | 18.0 |
| Dibutyl para aminophenol | 10.0 |
| Diamyl para aminophenol | 9.0 |

Other compounds embraced by our invention are as follows: monomethyl para aminophenol $C_6H_4.OH.NH(CH_3)$, monoethyl para aminophenol $C_6H_4.OH.NH(C_2H_5)$, monopropyl para aminophenol $C_6H_4.OH.NH(C_3H_7)$, monobutyl para aminophenol $C_6H_4.OH.NH(C_4H_9)$, monoamyl para aminophenol $C_6H_4.OH.NH(C_5H_{11})$, dimethyl para aminophenol $C_6H_4.OH.N(CH_3)_2$, diethyl para aminophenol $C_6H_4.OH.N(C_2H_5)_2$, dipropyl para aminophenol $C_6H_4.OH.N(C_3H_7)_2$, dibutyl para aminophenol $C_6H_4.OH.N(C_4H_9)_2$, diamyl para aminophenol $C_6H_4.OH.N(C_5H_{11})_2$.

The selective activity and novelty of our preferred alkyl aminophenols aforedescribed is further emphasized by the fact that we have found that homologues of these compounds while possessing some value, do not function with the effectiveness of our preferred agents. As an example of this, the ortho substituted aminophenols may be mentioned.

In addition to saving scrubbing medium by the incorporation of our alkyl aminophenols into the scrubbing medium, other savings may be entailed in the process. It is apparent that in the prior art processes where several percent oil may be lost in the sludge and wherein sludge is formed, that to a substantial extent this sludge may represent losses of hydrocarbon components from the artificial gas.

For example, in many instances artificial gas may contain more or less styrene. In conventional processes this styrene may be lost in the step of reactivating the scrubbing oil or other steps in the process which may cause the polymerization of the styrene. However, in our process wherein the scrubbing medium contains one or more alkyl aminophenols, we have found that styrene extracted into this scrubbing medium remains substantially intact during the scrubbing and subsequent processing and reactivation of the scrubbing medium. Inasmuch as the styrene remains available as such, it may be recovered by any conventional method as for example by separation from the scrubbing medium, reacted in the scrubbing medium or otherwise utilized. Similar remarks apply to other valuable components which may be present in the artificial gas such as indene. If such other unstable and unsaturated compounds are extracted into the scrubbing medium, they remain more or less intact and in condition for recovery.

As already pointed out, our reagents may be incorporated into scrubbing mediums in various proportions. Usually less than ½% by weight of the scrubbing medium is sufficient, but higher amounts may be employed and are governed by the added advantages obtained in comparison to the extra expense.

Our reagent may be constantly or intermittently supplied to the scrubbing medium or otherwise incorporated therewith. Consequently, we do not wish to be restricted in this respect. Our novel scrubbing mediums usually comprising a petroleum oil and at least one alkyl aminophenol, may be used in the recovery of unstable unsaturated compounds such as styrene, indene and the like from sources other than artificial gas.

It is apparent from the foregoing that our invention is susceptible of some modification; hence, we do not wish to be restricted excepting insofar as may be necessitated by the prior art and the spirit of the appended claims.

What we claim and desire to be secured by Letters Patent of the United States is:

1. In the manufacture of artificial gas by procedure wherein the gas is subjected to a scrubbing medium essentially comprised of straw oil, the step which comprises scrubbing said gas with a straw oil scrubbing medium containing a small amount of an alkyl aminophenol.

2. The process which comprises scrubbing an artificial gas with a scrubbing medium essentially comprised of oily liquid having a boiling point and fluidity similar to straw oil and containing at least one alkyl aminophenol, reactivating the scrubbing medium by procedure including heating the medium, and recycling the reactivated medium.

3. In the process for recovering valuable unsaturated hydrocarbon components from artificial gas, the step which comprises contacting said gas with a scrubbing medium essentially comprised of a relatively high boiling point fluid solvent capable of absorbing said unsaturated hydrocarbons, and said solvent also having incorporated therewith at least one para alkyl substituted aminophenol.

4. In the treatment of artificial gas by procedure including scrubbing the gas, the steps of minimizing gum formation and losses of scrubbing medium, which comprises employing scrubbing medium essentially comprised of a liquid having a boiling point substantially above the boiling point of gasoline having therein at least a small content of at least one alkyl substituted para aminophenol.

5. The process of treating gas which comprises scrubbing the gas with a scrubbing medium comprising a petroleum oil having properties similar to straw oil having present therein a small content of at least one alkyl substituted para aminophenol, subjecting the scrubbing medium to a reactivation including heating, and returning the scrubbing medium for contacting further gas.

6. In a process for the treatment of a gas containing styrene, the step which comprises contacting said gas with a scrubbing medium comprised of a petroleum oil having properties similar to straw oil which is a solvent for styrene, said oil having incorporated therein a small content of an alkyl substituted para aminophenol.

7. A composition of matter adapted for scrubbing artificial gas which comprises a straw oil scrubbing medium having incorporated therein a content of an aminophenol sufficient to impart a sludge preventing ratio greater than 5.

8. The process which comprises contacting manufactured gas with an oily scrubbing liquid having a boiling point substantially higher than the boiling point of gasoline, heating the effluent scrubbing liquid from the foregoing step to regenerate the scrubbing medium, reutilizing the regenerated liquid for contacting further gas, the foregoing process being characterized in that when the liquid is undergoing said heating, said scrubbing liquid contains a small content of at least one para aminophenol compound.

9. In a process which includes the steps of contacting gas with an oily scrubbing liquid which is relatively fluid and free flowing, but of a high boiling point, the heating of the used scrubbing liquid for regeneration and the reutilization of the regenerated liquid, the step which comprises incorporating into said scrubbing medium a content of at least one aminophenol compound.

10. The process which comprises contacting gas with an oily scrubbing liquid relatively fluid and free flowing, but having a high boiling point to scrub out components from said gas, said scrubbing liquid being characterized in that it contains a content of at least one aminophenol, heating the liquid resulting from the foregoing scrubbing step to separate the scrubbing liquid and at least part of the aminophenol from components taken up, and reemploying the liquid containing said aminophenol which has been separated for contacting with further gas.

11. The process which comprises contacting gas with a scrubbing medium essentially comprised of straw oil, heating the liquid obtained from the foregoing scrubbing step to regenerate said straw oil, reutilizing the regenerated liquid for contacting with further gas, said process being characterized in that said straw oil when it is undergoing the foregoing heating contains therein a content of at least one aminophenol.

LOUIS J. FIGG, JR.
EDWARD E. SHAULIS.